US011067450B2

(12) United States Patent
Shi et al.

(10) Patent No.: US 11,067,450 B2
(45) Date of Patent: Jul. 20, 2021

(54) MEASUREMENT APPARATUS OF WAVEFRONT AND POLARIZATION PROFILE OF VECTORIAL OPTICAL FIELDS

(71) Applicant: University of South Florida, Tampa, FL (US)

(72) Inventors: Zhimin Shi, Tampa, FL (US); Darrick Hay, Brandon, FL (US); Ziyi Zhu, Tampa, FL (US); Yiyu Zhou, Rochester, NY (US); Robert W. Boyd, Webster, NY (US)

(73) Assignee: University of South Florida, Tampa, FL (US)

( * ) Notice: Subject to any disclaimer, the term of this patent is extended or adjusted under 35 U.S.C. 154(b) by 29 days.

(21) Appl. No.: 16/404,600

(22) Filed: May 6, 2019

(65) Prior Publication Data

US 2020/0011737 A1    Jan. 9, 2020

Related U.S. Application Data

(60) Provisional application No. 62/694,758, filed on Jul. 6, 2018.

(51) Int. Cl.
*G01J 4/04* (2006.01)
*G01J 11/00* (2006.01)

(52) U.S. Cl.
CPC ............ *G01J 4/04* (2013.01); *G01J 11/00* (2013.01)

(58) Field of Classification Search
CPC .................................................... G01J 4/04
USPC ............................................................. 356/368
See application file for complete search history.

(56) References Cited

U.S. PATENT DOCUMENTS

| 7,019,882 | B1 | 3/2006 | Wilson | |
|---|---|---|---|---|
| 9,768,909 | B2 | 9/2017 | Huang | |
| 10,006,859 | B2 | 6/2018 | Ashrafi | |
| 10,587,345 | B2 | 3/2020 | Shi | |
| 2003/0156307 | A1* | 8/2003 | Schuck | G11B 7/1356 359/21 |
| 2004/0004746 | A1* | 1/2004 | Riza | G02B 26/106 359/204.1 |
| 2008/0019632 | A1 | 1/2008 | Ishii | |
| 2008/0170639 | A1* | 7/2008 | Vassilieva | H04B 10/532 375/300 |

(Continued)

OTHER PUBLICATIONS

Q. Zhan, "Cylindrical vector beams: from mathematical concepts to applications," Adv. Opt. Photon. 1, 1-57 (2009).

(Continued)

*Primary Examiner* — Tarifur R Chowdhury
*Assistant Examiner* — Omar H Nixon
(74) *Attorney, Agent, or Firm* — Meunier Carlin & Curfman LLC

(57) ABSTRACT

An apparatus measures the transverse profile of vectorial optical field beams, including both the phase and the polarization spatial profile. The apparatus contains a polarization separation module, a weak perturbation module, and a detection module. Characterizing the transverse profile of vector fields provides an optical metrology tool for both fundamental studies of vectorial optical fields and a wide spectrum of applications, including microscopy, surveillance, imaging, communication, material processing, and laser trapping.

18 Claims, 7 Drawing Sheets

(56) References Cited

U.S. PATENT DOCUMENTS

| | | | |
|---|---|---|---|
| 2010/0295930 A1* | 11/2010 | Ezhov | G02B 30/25 |
| | | | 348/58 |
| 2011/0243175 A1 | 10/2011 | Evans | |
| 2011/0243574 A1 | 10/2011 | Essiambre | |
| 2011/0274429 A1 | 11/2011 | Caplan | |
| 2012/0076301 A1 | 3/2012 | Kanter | |
| 2012/0230686 A1 | 9/2012 | Tang | |
| 2013/0064554 A1 | 3/2013 | Li | |
| 2015/0002852 A1* | 1/2015 | de Groot | G01B 9/02081 |
| | | | 356/491 |
| 2015/0323781 A1 | 11/2015 | Schneider | |
| 2016/0061723 A1* | 3/2016 | Alonso | G01B 11/30 |
| | | | 356/364 |
| 2016/0204866 A1 | 7/2016 | Boroson | |
| 2016/0248515 A1* | 8/2016 | Zheng | H04J 14/06 |
| 2017/0207850 A1 | 7/2017 | Takahashi | |
| 2019/0036305 A1 | 1/2019 | Lu | |
| 2019/0312402 A1 | 10/2019 | Lucas | |

OTHER PUBLICATIONS

A. F. Abouraddy and K. C. Toussaint, "Three-dimensional polarization control in microscopy," Phys. Rev. Lett. 96, 153901 (2006).

Q. Zhan and J. R. Leger, "Focus shaping using cylindrical vector beams," Opt. Express 10, 324-331 (2002).

M. G. Donato, S. Vasi, R. Sayed, P. H. Jones, F. Bonaccorso, A. C. Ferrari, P. G. Gucciardi, and O. M. Maragò, "Optical trapping of nanotubes with cylindrical vector beams," Opt. Lett. 37, 3381-3383 (2012).

H. Rubinsztein-Dunlop, et al., "Roadmap on structured light," J. Opt. 19, 013001 (2017).

M. Beresna, M. Gecevič̆ius, and P. G. Kazansky, "Polarization sensitive elements fabricated by femtosecond laser nanostructuring of glass," Opt. Mater. Express 1, 783-795 (2011).

G. Milione, T. A. Nguyen, J. Leach, D. A. Nolan, and R. R. Alfano, "Using the nonseparability of vector beams to encode information for optical communication," Opt. Lett. 40, 4887-4890 (2015).

G. Milione, M. P. J. Lavery, H. Huang, Y. Ren, G. Xie, T. A. Nguyen, E. Karimi, L. Marrucci, D. A. Nolan, R. R. Alfano, and A. E. Willner, "4 × 20 gbit/s mode division multiplexing over free space using vector modes and a q-plate mode (de)multiplexer," Opt. Lett. 40, 1980-1983 (2015).

Y. Zhao and J. Wang, "High-base vector beam encoding/decoding for visible-light communications," Opt. Lett. 40, 4843-4846 (2015).

A. Sit, F. Bouchard, R. Fickler, J. Gagnon-Bischoff, H. Larocque, K. Heshami, D. Elser, C. Peuntinger, K. Giinthner, B. Heim, C. Marquardt, G. Leuchs, R. W. Boyd, and E. Karimi, "High-dimensional intracity quantum cryptography with structured photons," Optica 4, 1006-1010 (2017).

C. Maurer, A. Jesacher, S. Fürhapter, S. Bernet, and M. Ritsch-Marte, "Tailoring of arbitrary optical vector beams," New J Phys 9, 78 (2007).

X.-L. Wang, J. Ding, W.-J. Ni, C.-S. Guo, and H.-T. Wang, "Generation of arbitrary vector beams with a spatial light modulator and a common path interferometric arrangement," Opt. Lett. 32, 3549-3551 (2007).

L. Marrucci, C. Manzo, and D. Paparo, "Optical spin-to-orbital angular momentum conversion in inhomogeneous anisotropic media," Phys. Rev. Lett. 96, 163905 (2006).

S. Slussarenko, A. Murauski, T. Du, V. Chigrinov, L. Marrucci, and E. Santamato, "Tunable liquid crystal q-plates with arbitrary topological charge," Opt. Express 19, 4085-4090 (2011).

F. Cardano, E. Karimi, S. Slussarenko, L. Marrucci, C. de Lisio, and E. Santamato, "Polarization pattern of vector vortex beams generated by q-plates with different topological charges," Appl. Opt. 51, C1-C6 (2012).

G. Volpe and D. Petrov, "Generation of cylindrical vector beams with few-mode fibers excited by laguerre-gaussian beams," Opt. Commun. 237, 89-95 (2004).

S. Ramachandran, P. Kristensen, and M. F. Yan, "Generation and propagation of radially polarized beams in optical fibers," Opt. Lett. 34, 2525-2527 (2009).

Z. Zhao, J.Wang, S. Li, and A. E.Willner, "Metamaterials-based broadband generation of orbital angular momentum carrying vector beams," Opt. Lett. 38, 932-934 (2013).

A. Arbabi, Y. Horie, M. Bagheri, and A. Faraon, "Dielectric metasurfaces for complete control of phase and polarization with subwavelength spatial resolution and high transmission," Nat. Nanotechnol 10, 937-943 (2015).

J. S. Tyo, D. L. Goldstein, D. B. Chenault, and J. A. Shaw, "Review of passive imaging polarimetry for remote sensing applications," Appl. Opt. 45, 5453-5469 (2006).

B. Ndagano, I. Nape, B. Perez-Garcia, S. Scholes, R. I. Hernandez-Aranda, T. Konrad, M. P. Lavery, and A. Forbes, "A deterministic detector for vector vortex states," Sci. Rep. 7, 13882 (2017).

M. McLaren, T. Konrad, and A. Forbes, "Measuring the nonseparability of vector vortex beams," Phys. Rev. A 92, 023833 (2015).

R. V. Shack and B. C. Platt, "Production and use of a lenticular Hartmann screen (abstract)," J. Opt. Soc. Am. 61, 656 (1971).

R. N. Smartt and J. Strong, "Point-diffraction interferometer (abstract)," J. Opt. Soc. Am. 62, 737 (1972).

K. L. Marshall, K. Adelsberger, G. Myhre, and D. W. Griffin, "The LCPDI: A compact and robust phase-shifting point-diffraction interferometer based on dye-doped lc technology," Molecular Crystals and Liquid Crystals 454, 23/[425]-45/[447] (2006).

R. M. Neal and J. C. Wyant, "Polarization phase-shifting point diffraction interferometer," Appl. Opt. 45, 3463-3476 (2006).

J. R. Fienup, "Phase retrieval algorithms: a comparison," Appl. Opt. 21, 2758-2769 (1982).

G. Sirat and D. Psaltis, "Conoscopic holography," Opt. Lett. 10, 4-6 (1985).

K. Buse and M. Luennemann, "3d imaging: Wave front sensing utilizing a birefringent crystal," Phys. Rev. Lett. 85, 3385-3387 (2000).

R. Ragazzoni, E. Marchetti, and F. Rigaut, "Modal tomography for adaptive optics," Astron. Astrophys. 342, L53-L56 (1999).

E. Wolf, "Solution of the phase problem in the theory of structure determination of crystals from x-ray diffraction experiments," Phys. Rev. Lett. 103, 075501 (2009).

J. S. Lundeen, B. Sutherland, A. Patel, C. Stewart, and C. Bamber, "Direct measurement of the quantum wavefunction," Nature 474, 188 (2011).

J. S. Lundeen and C. Bamber, "Procedure for direct measurement of general quantum states using weak measurement," Phys. Rev. Lett. 108, 070402 (2012).

S. Wu, "State tomography via weak measurements," Sci. Rep. 3, 1193 (2013).

M. Mirhosseini, O. S. Magaña Loaiza, S. M. Hashemi Rafsanjani, and R. W. Boyd, "Compressive direct measurement of the quantum wave function," Phys. Rev. Lett. 113, 090402 (2014).

J. Z. Salvail, M. Agnew, A. S. Johnson, E. Bolduc, J. Leach, and R. W. Boyd, "Full characterization of polarization states of light via direct measurement," Nat. Photonics 7, 316-321 (2013).

M. Malik, M. Mirhosseini, M. P. Lavery, J. Leach, M. J. Padgett, and R. W. Boyd, "Direct measurement of a 27-dimensional orbital-angularmomentum state vector," Nat. Commun. 5, 3115 (2014).

Z. Shi, M. Mirhosseini, J. Margiewicz, M. Malik, F. Rivera, Z. Zhu, and R. W. Boyd, "Scan-free direct measurement of an extremely high dimensional photonic state," Optica 2, 388-392 (2015).

B. Perez-Garcia, C. López-Mariscal, R. I. Hernandez-Aranda, and J. C. Gutiérrez-Vega, "On-demand tailored vector beams," Appl. Opt. 56, 6967-6972 (2017).

J. A. Davis, D. M. Cottrell, J. Campos, M. J. Yzuel, and I. Moreno, "Encoding amplitude information onto phase-only filters," Appl. Opt. 38, 5004-5013 (1999).

V. Arrizón, U. Ruiz, R. Canada, and L. A. González, "Pixelated phase computer holograms for the accurate encoding of scalar complex fields," J. Opt. Soc. Amer. A 24, 3500-3507 (2007).

A. M. Beckley, T. G. Brown, and M. A. Alonso, "Full poincaré beams," Opt. Express 18, 10777-10785 (2010).

(56) References Cited

OTHER PUBLICATIONS

Notice of Allowance issued for U.S. Appl. No. 16/396,618, dated Oct. 29, 2019.

* cited by examiner

US 11,067,450 B2

MEASUREMENT APPARATUS OF WAVEFRONT AND POLARIZATION PROFILE OF VECTORIAL OPTICAL FIELDS

CROSS REFERENCE TO RELATED APPLICATIONS

This application claims priority to and incorporates entirely by reference U.S. Provisional Patent Application Ser. No. 62/694,758 filed on Jul. 6, 2018, and entitled "Measurement Apparatus of Wavefront and Polarization Profile of Vectorial Optical Fields."

STATEMENT REGARDING FEDERALLY SPONSORED RESEARCH

This invention was made with government support under Grant No. N00014-17-1-2443, each awarded by the Office of Naval Research. The Government has certain rights in the invention.

FIELD

The disclosure generally relates to methods and systems implementing encoded communication protocols that utilize vectorial optical fields as the information carrier.

BACKGROUND

This disclosure explains systems and methods of using phase differences in optical signals to encode data that can be subject to accurate decoding at a receiving end. Earlier technologies for this kind of work include differential phase shift keying protocols that detect changes in phase to transfer a bit of information. Quadrature differential phase shift keying (4-DPSK) is similar but uses one symbol to transfer two bits of information.

Vector beams [1], characterized by their spatially-varying polarization states, have garnered tremendous popularity recently due to their potential applications in optical microscopy [2, 3], optical tweezers [4], optical metrology [5], laser material processing [6], and optical communication [7-10]. Over the past few years, many methods have been investigated to generate vector beams using e.g., spatial light modulators (SLM) [11, 12], Q-plates [13-15], optical fibers [16, 17], and metamaterials [18, 19].

To date, most studies have characterized vector beams using imaging polarimetry [20], where intensity images are obtained of the beam after passing through polarization filtering. While such a method conveniently reveals the spatial polarization profile of vector beams, it does not provide any information about the relative phase between the fields at any two points across the beam. Some methods have characterized vector beams composed of a limited number of selected spatial polarization modes [21, 22], but since the limited number of modes typically do not span a complete mode basis set, these methods are also incapable of fully describing the transverse profile of a vector beam. There are numerous techniques that can measure the transverse phase profile of scalar beams, which include shear interferometry[23], Shack-Hartmann microlens array [24, 25], point diffraction interferometry [26-28], phase-shifting interferometry [23], phase retrieval [29], conoscopic holography [30, 31], tomographic imaging [32], and coherence measurements [33]. However, these available phase measurement techniques are all designed for scalar beams and cannot be reveal the polarization profile of vector beams.

The embodiments provided herein address two challenges in optical communication. One is how to increase the photon efficiency or information density on an optical link. The second challenge is how to carry information through turbid media without data degradation.

SUMMARY

This disclosure describes an apparatus that can measure the transverse profile of vectorial optical fields (beams), including both the phase and the polarization spatial profile. The apparatus contains a polarization separation module, a weak perturbation module, and a detection module. The unique capability of fully characterizing the transverse profile of vector fields can provide a powerful optical metrology tool for both fundamental studies of vectorial optical fields and a wide spectrum of applications, including microscopy, surveillance, imaging, communication, material processing, laser trapping, and the like.

In one embodiment, a computerized method of transmitting information via an optical vector beam (250) includes encoding the data onto a primary optical beam (200) to form the optical vector beam (250), wherein the encoding comprises differential spatial phase shift keying (DSPSK) in which the data is represented by physical changes in the optical vector beam (250) across spatially separated portions of the optical vector beam (250). The method further includes decoding the data by identifying respective polarization states (310, 320, 330) and respective phase measurements for the spatially separated portions of the optical vector beam. The method includes (i) selecting, from the spatially separated portions of the optical vector beam, at least two orthogonally polarized portions of the optical vector beam and (ii) identifying the data in the optical vector beam by tracking differences between the respective phase measurements (370, 380) for the at least two orthogonally polarized portions (410, 420, 430, 440) of the optical vector beam (250).

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

DETAILED DESCRIPTION

Figure 1:
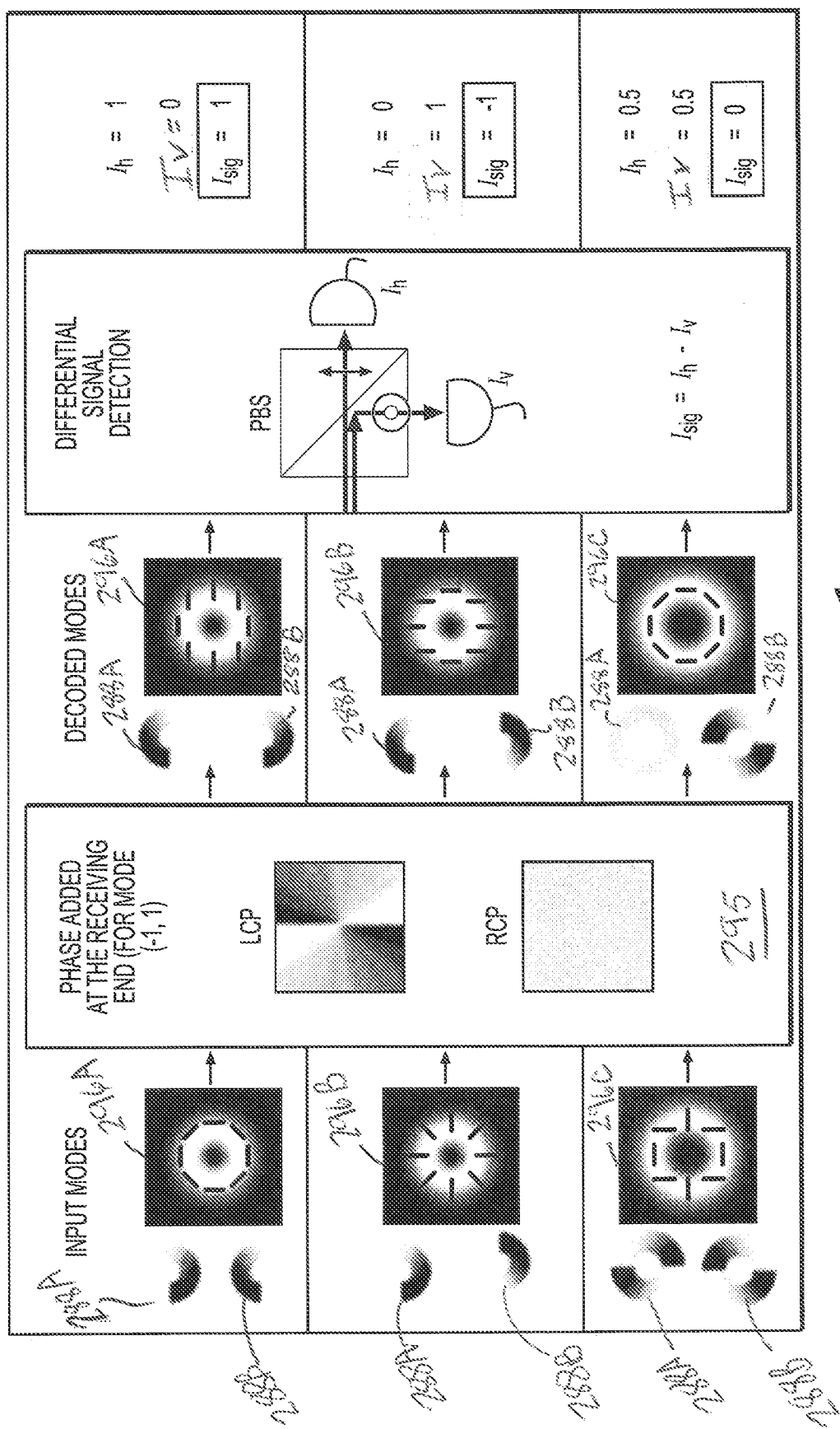
FIG. 1 is a schematic representation of data (information) encoded on vector vortex modes having left and right circular polarization.

The following description of the disclosure is provided as an enabling teaching of the disclosure in its best, currently known embodiment(s). To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Vector modes disclosed herein are optical beams that have complex transverse polarization and phase profiles, including but not limited to radial and azimuthal vector beams and full Poincare beams.

Unless defined otherwise, all technical and scientific terms used herein have the same meaning as commonly understood to one of ordinary skill in the art to which this invention belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Publications cited herein are hereby incorporated specifically by reference in their entireties and at least for the material for which they are cited.

For spatial polarization profiles, such as vector modes of communication described herein, information may be modeled as being carried by the relative phase between two orthogonally-polarized components. The phase difference is spatially varying and can span multiple dimensions. Taking advantage of the phase difference for information transmission involves encoding the information with vector vortex modes and then decoding the information by applying polarization-dependent, spatially varying phase masks before interferometric detection.

Information carried by light may be characterized as transmitting data three-dimensional space, or even higher dimensionality. As the dimensionality increases, the states of photons in the light are not orthogonal, requiring a balance between efficiency in encoding and transmission and accuracy in decoding.

Figure 2A:
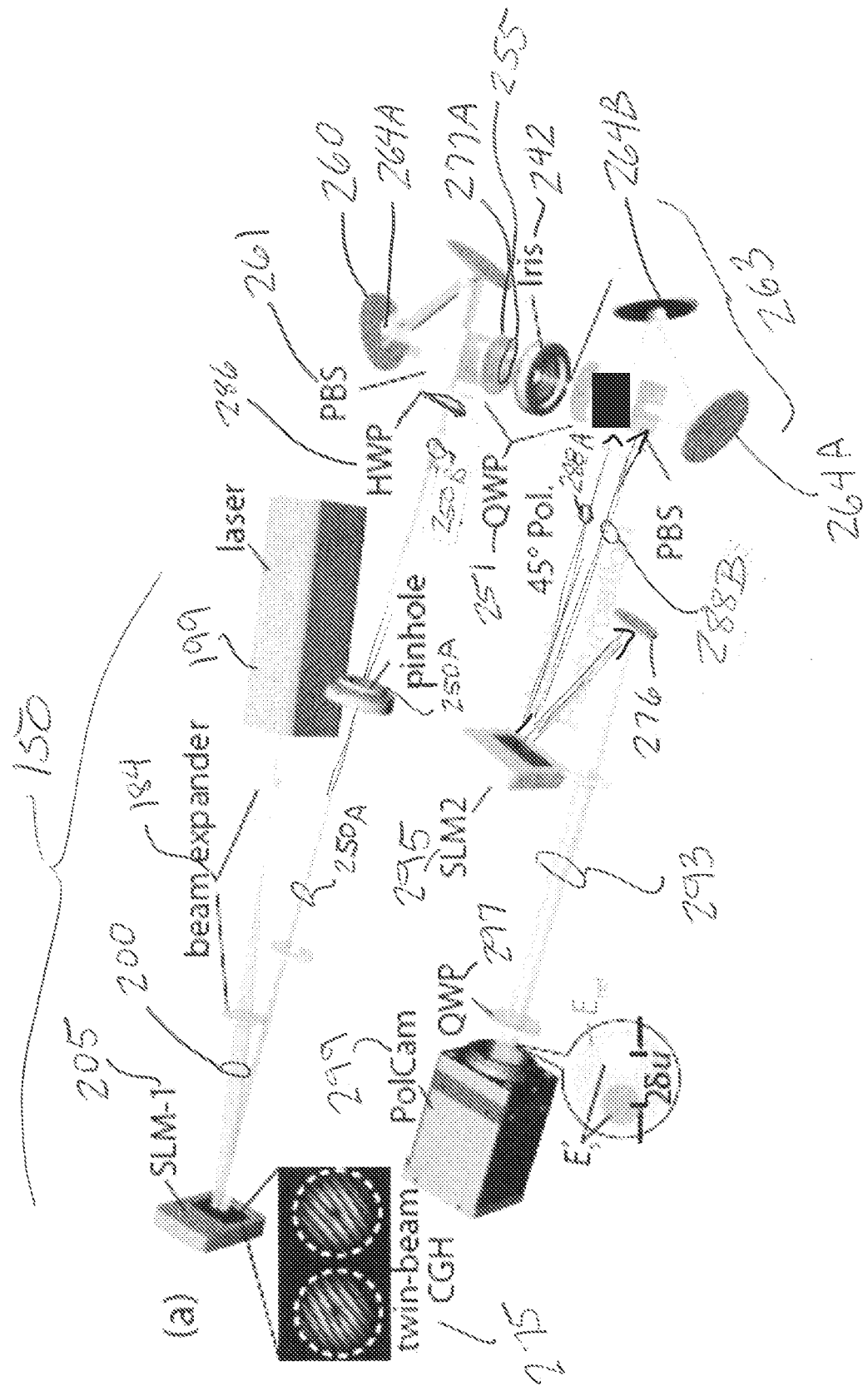
FIG. 2A is a schematic representation of the encoding and decoding process applied in higher dimensionality data with the equipment as described herein.
Figure 2C:
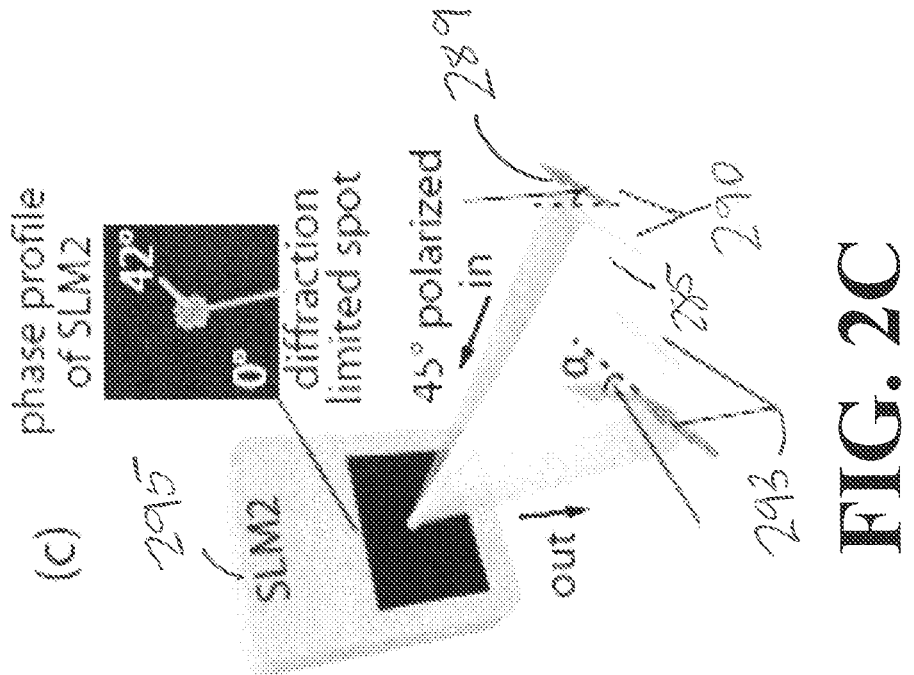
FIG. 2C is a schematic representation of a perturbation set-up to establish a reference field in the generated vector beam of FIG. 2B.
Figure 2B:
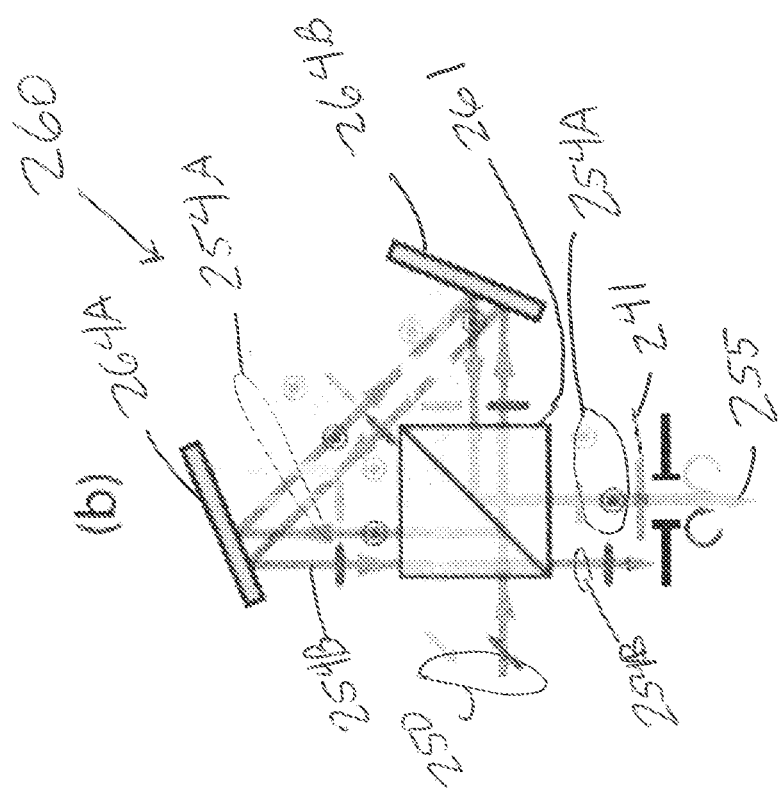
FIG. 2B is a schematic representation of a generation module to form a generated-vector beam having left and right circular polarization of spatially separated and orthogonally polarized twin beams as set forth herein.
Figure 3:
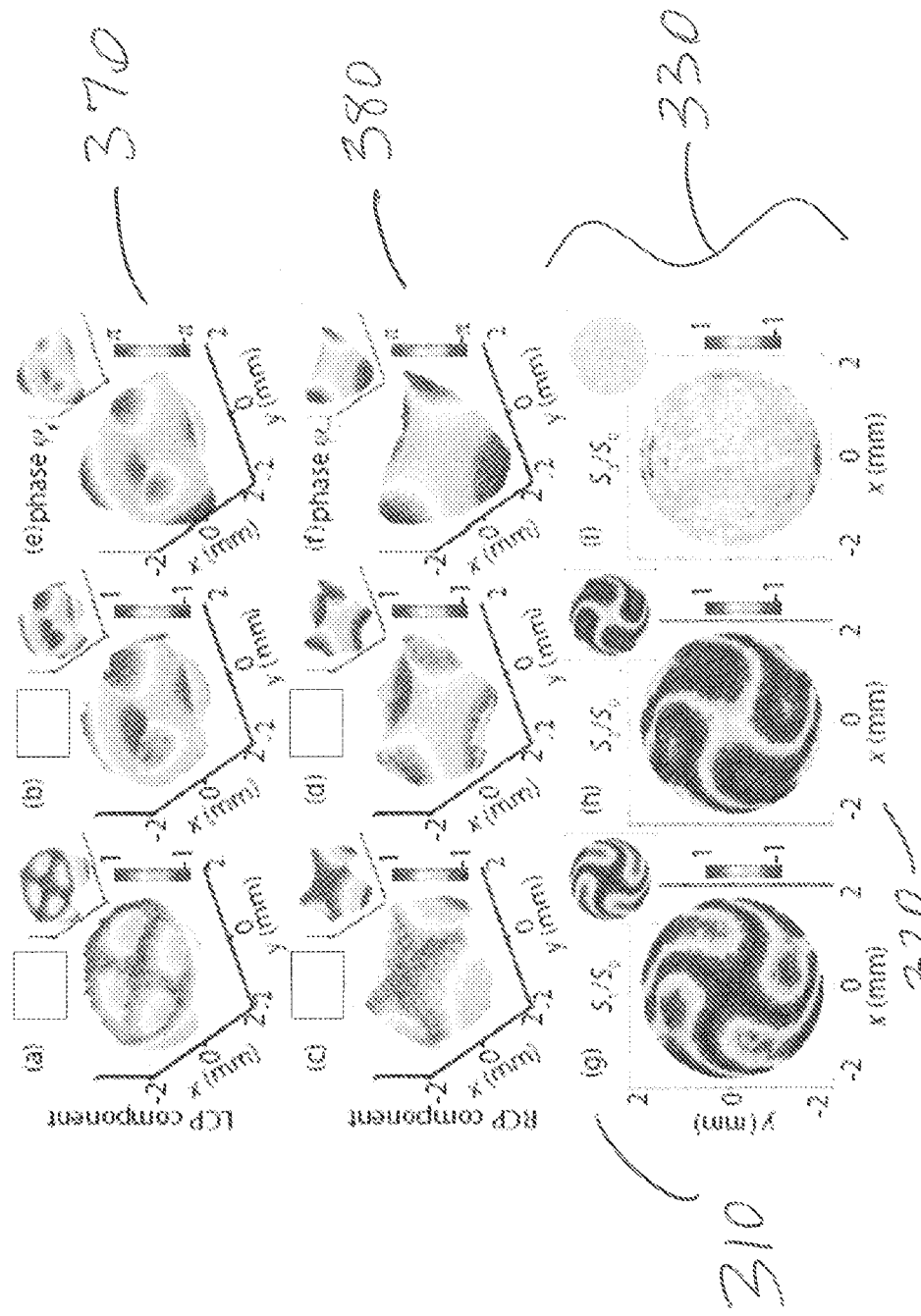
FIG. 3 is a set of image representation of physical characteristics of the generated vector beam of FIG. 2B.
Figure 4:
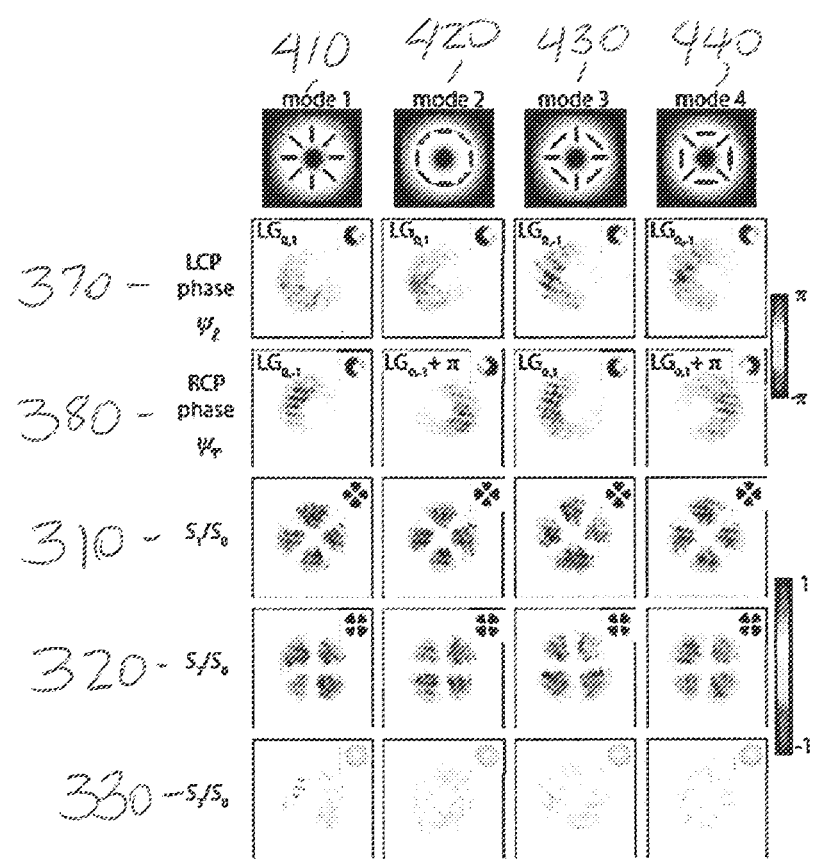
FIG. 4 is a transverse polarization characterization of four modes in the generated vector beam of FIG. 2B.
Figure 5:
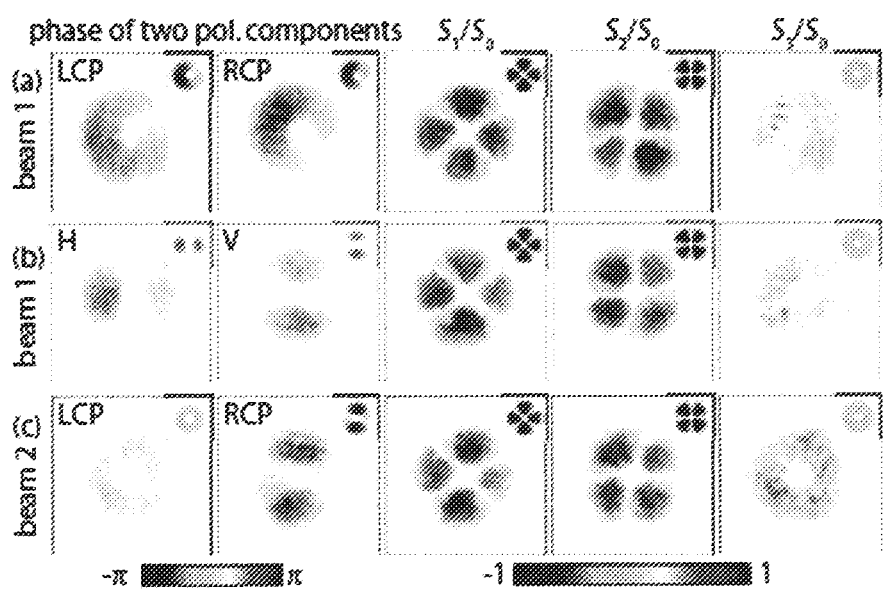
FIG. 5 is a schematic representation of a measured phase of the two polarization components and the normalized Stokes parameters of vortex beams according to this disclosure.
Figure 6:
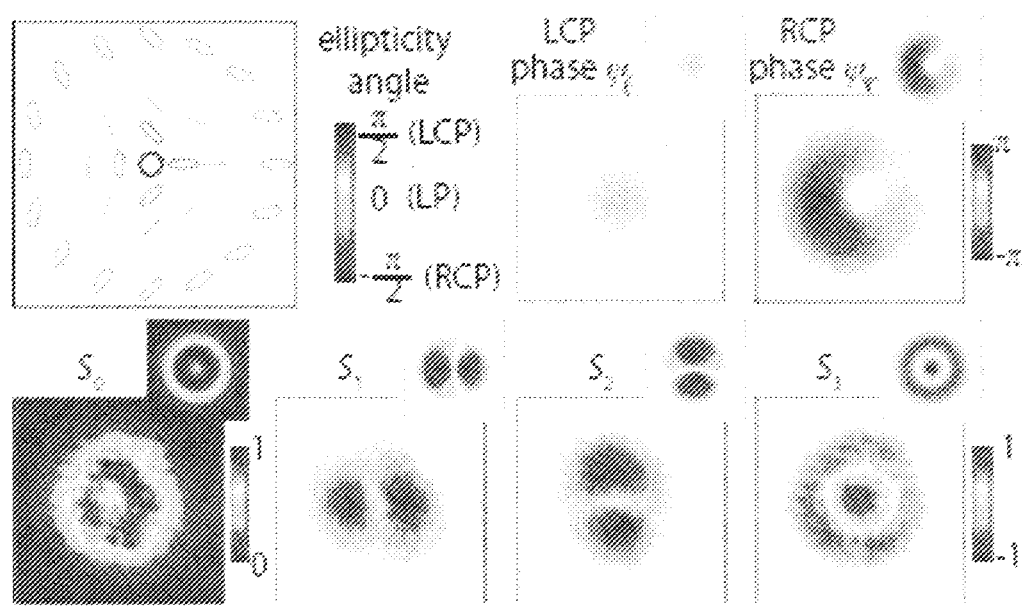
FIG. 6 is a schematic representation of a measured phase of the two circular polarization components of normalized Stokes parameters of a full Poincare' beam.

FIG. 1 illustrates an example of the vector beam basis for light encoding and shows how the phase shift of left and right circularly polarized light is detectable for decoding. The encoding and decoding process as shown in FIG. 2 illustrates that input optical signals are encoded according to phase for decoding at an opposite end via a polarizing beam splitter for phase shift detection. More particularly, FIG. 2(a) shows a schematic diagram of the experimental setup which includes a vector beam generation module and a direct measurement module. FIG. 2(b) is a detailed illustration of a Sagnac interferometer for generating a vector beam from a 45 degree linearly-polarized twin-beam input. FIG. 2(c) is a diagram explaining the weak polarization perturbation using a polarization-sensitive phase-only spatial light modulator. A diffracted-limited area on SLM-2 is set at a 42-degree phase such that the reflected field from that small area has an approximately 19-degree rotated polarization as compared to that of the twin-beam. FIGS. 3(a)-3(d) show the directly measured real and imaginary parts of the left- and right-handed circular polarization components of a vector beam that has uniform amplitude over a circular aperture and Zernike polynomial Z2/4 and Z-2/2 phase profiles; FIGS. 3(e) and 3(f) show the corresponding phase profiles of the two polarization components; FIGS. 3(g), 3h, and 3(i) illustrate the corresponding normalized Stokes parameters of the vector beam. Insets on the upper right corner are theoretical predictions. FIG. 4 shows a measured phase of the two polarization components and the normalized Stokes parameters of a series of four vector vortex beams that are commonly used for high dimensional optical communication. These vector vortex beams are comprised of LG 0,1 and LG 0,−1 Laguerre-Gaussian beams as the polarization components and with different phase difference between the two polarization components. The color saturation reflects the experimentally-measured intensity of the beams. Insets in the upper-right corner are theoretical predictions. In FIG. 5, the measured phase of the two polarization components and the normalized Stokes parameters of (a) a vector vortex beam comprised of LG 0,1 and LG 0,−1 Laguerre-Gaussian modes as two circular polarization components; (b) the same beam measured in the horizontal and vertical polarization bases; and (c) a different beam that has identical polarization profiles but different phase profiles for the two polarization components. The color saturation reflects the experimentally-measured intensity of the beams. Insets in the upper-right corner are theoretical predictions. FIG. 6 is the measured phase of the two-circular polarization components and the normalized Stokes parameters of a full Poincare beam. The color saturation reflects the experimentally-measured intensity of the beams. Insets in the upper-right corner are theoretical predictions, and the theoretical polarization profile of this beam is illustrated in the upper left corner of the figure.

From an information retrieval point of view, both the transverse polarization and phase profile of a vector beam carry information, and therefore a characterization method that can reveal information encoded in all the degrees of freedom available in a vector beam is naturally desired. Furthermore, in many applications, including imaging and communication, a vector beam typically needs to propagate through an optical system or interact with various optical elements. With the knowledge of both polarization and phase profiles, one can predict the evolution of vector beams upon propagating through an optical system or even free space. With the current surge of fundamental studies and applications, there is a huge demand for the development of a high-efficiency characterization method with the capability to fully characterize vector beams.

This disclosure shows a direct measurement method that is capable of measuring the complete transverse spatial profile of both polarization and complex-amplitude of a fully-polarized vector beam in a single shot. The term "direct measurement" was first introduced in the context of quantum state metrology [34]. It refers to metrology protocols in which the measurement readouts directly correspond to the complex-valued state vector or other quantities that describe the quantum system to be measured [35-40]. Compared to conventional quantum state tomography, direct measurement offers an alternative metrology technique that can greatly reduce the experimental complexity involved in characterizing a high-dimensional quantum system. The embodiments of this disclosure show a direct measurement protocol by experimentally generating and characterizing various vector beams, including vector vortex beams and full Poincare beams that are often used in applications. The unique single-shot, full characterization capability of the method provides a powerful real-time metrology tool that can boost fundamental studies of vector optical fields as well as a wide spectrum of applications of vector beams.

While various direct measurement protocols have been developed in quantum mechanical language, most of them can be described and understood equally well in the classical picture. Thus, the direct measurement protocol herein uses physical optics terminology. A spatially-coherent vector beam can be described by the superposition of two scalar beams with orthogonal polarizations. In the circular polarization basis, for example, the transverse vectorial field profile E(u, v) at the initial (u, v) plane can be written as follows:

$$\vec{E}(u,v) = \hat{e}_l E_l(u,v) + \hat{e}_r E_r(u,v), \quad (1)$$

where el and er denote the unit vectors in the left- and right circular polarization (LCP and RCP) basis, respectively, and El (u, v) and Er (u, v) denote the transverse complex-amplitude profile of the two circular polarization components, respectively.

In order to fully characterize the transverse profile of a vector beam defined by Eq. (1), one must first introduce a relative transverse shift 2du between the two polarization components of the vector beam. Here the value of du is chosen to be slightly larger than the radius of the beam such that the two polarization components are non-overlapping. At the same time, adjusting the polarization of the two components into the same horizontal linear polarization state is necessary, since the total beam now has two spatially-separated parts, referred to as the "twin-beam". The field profile of the twin-beam exEs(u, v), after such polarization separation and adjustment can be written as follows:

$$\hat{e}_x E_s(u,v) = \hat{e}_x [E_l(u+\delta u, v) + E_r(u-\delta u, v)]. \quad (2)$$

Since the twin-beam has now become a spatially-coherent scalar beam of a single polarization, one may apply the recently developed scan-free direct measurement technique [40] to characterize its total transverse beam profile. Specifically, the experimental apparatus is based on a 4-f imaging system, where f is the focal length of the lenses. For a twin-beam exEs(u, v) at the input plane of the 4-f system, the field at the focal plane between the two lenses is the Fourier transform of Es(u, v) as follows:

$$\vec{E}_p(\xi,\eta) = \hat{e}_x E_p(\xi,\eta) = \hat{e}_x \mathcal{F}\{E_s(u,v)\}, \quad (3)$$

where the variables denote the transverse coordinates on the focal plane. A weak perturbation, in the form of a small polarization rotation of angle a, is applied to the field over a diffraction limited area in the vicinity of the center of Ep(x, h). After such a weak polarization perturbation, the total field exiting the focal plane has two polarization components, which can be expressed as:

$$\vec{E}'_p(\xi,\eta) = \hat{e}_x E_p(\xi,\eta)[1+(\cos\alpha-1)\delta(\xi-\xi_0,\eta-\eta_0)] + \quad (4)$$
$$\hat{e}_y E_P(\xi,\eta)[\sin\alpha\delta(\xi-\xi_0,\eta-\eta_0)] \approx$$
$$\hat{e}_x E_P(\xi,\eta) + \hat{e}_y \alpha E_P(\xi,\eta)\delta(\xi-\xi_0,\eta-\eta_0),$$

where a is the angle of polarization rotation and d(x-x0, h-h0) is Dirac delta function centered at (x0, h0). One sees that when the angle of polarization rotation a is sufficiently small, the x-polarized component at the Fourier plane can be approximated as the original unperturbed field Ep(x, h), and the generated y-polarized field is essentially a point source located at (x0, h0).

The field at the image (x, y) plane of the 4-f system is the Fourier transform of the weakly-perturbed field at the focal plane, can be further converted to the horizontal and vertical (H and V) polarization components into RCP and LCP, respectively. The final detected field can be written as follows:

$$\vec{E}'_{det}(x,y) = \hat{e}_\ell \mathcal{F}\{E_P(\xi,\eta)\} + \hat{e}_r \mathcal{F}\{\alpha E_P(\xi,\eta)\delta(\xi-\xi_0,\eta-\eta_0)\} \approx \quad (5)$$
$$\hat{e}_\ell E'_s(x,y) + \hat{e}_r E_{ref}(x,y),$$

where E's (x, y)=Es(-x,-y) is the flipped version of the twin-beam, and Eref(x, y)=Bexp(i2p(x0x+h0y)/l f) is an orthogonally-polarized reference field generated through the weak polarization perturbation process, and is essentially a plane wave of constant amplitude B and a well-defined linear phase profile.

One sees that the polarization state of the detected field varies across the transverse (x, y) detection plane, which can be expressed in terms of Stokes parameters as follows:

$$S1,\det(x,y) = I_h,\det(x,y) - I_v,\det(x,y), \quad (6)$$

$$S2,\det(x,y) = I_d,\det(x,y) - I_a,\det(x,y), \quad (7)$$

where Ih, Iv, Id and Ia are the intensity profile of the field component in the horizontal, vertical, diagonal and anti-diagonal linear polarization states, respectively, and are given by $$I_{h,det} = \frac{1}{2}|E'_s|^2 + \frac{1}{2}|E_{ref}|^2 + \Re\{E'_s E_{ref}^*\}, \quad (8)$$

$$I_{v,det} = \frac{1}{2}|E'_s|^2 + \frac{1}{2}|E_{ref}|^2 - \Re\{E'_s E_{ref}^*\}, \quad (9)$$

$$I_{d,det} = \tfrac{1}{2}|E_s'|^2 + \tfrac{1}{2}|E_{ref}|^2 - \Im\{E_s'E_{ref}^*\}, \quad (10)$$

$$I_{a,det} = \tfrac{1}{2}|E_s'|^2 + \tfrac{1}{2}|E_{ref}|^2 + \Im\{E_s'E_{ref}^*\}, \quad (8)$$

$\Re(x)$ and $\Im(x)$ denote the real and imaginary parts of the complex quantity x, respectively. Here, the spatial dependence of all the quantities are not explicitly shown for simplicity. Using these results, one can obtain the following relation between the Stokes parameters and the transverse field profile of the twin-beam, E's:

$$S_{1,det}(x,y) = 2\Re\{E_s'(x,y)E_{ref}^*(x,y)\},$$

$$S_{2,det}(x,y) = -2\Im\{E_s'(x,y)E_{ref}^*(x,y)\}. \quad (12)$$

The transverse complex amplitude profile of the twin-beam is therefore given by $$E_s'(x,y) = \frac{S_{1,det}(x,y) - iS_{2,det}(x,y)}{2E_{ref}^*(x,y)}. \quad (13)$$

The above expression shows that after the weak polarization perturbation, the polarization state of the final detected field, expressed in the linear basis, is directly proportional to the real and imaginary part, respectively, of the the transverse complex amplitude profile of the twin-beam. According to Eq. (2), the left and right parts of the field profile of the twin-beam Es(u, v) after coordinate flipping is exactly the transverse profile of the two polarization components, Ef(u, v) and Er(u, v), respectively, of the vector beam to be measured. Furthermore, since the two polarization components are measured simultaneously, the relative phase information between them is retained, which is essential for revealing its polarization profile. The Stokes parameters of the vector beam under test can then be obtained through the following relations:

$$S_0(u,v) = |E_l(u,v)|^2 + |E_r(u,v)|^2, \quad (14)$$

$$S_1(u,v) = 2\Re\{E_l^*(u,v)E_r(u,v)\}, \quad (15)$$

$$S_2(u,v) = -2\Im\{E_l^*(u,v)E_r(u,v)\}, \quad (16)$$

$$S_3(u,v) = |E_l(u,v)|^2 - |E_r(u,v)|^2, \quad (17)$$

To demonstrate a direct measurement protocol for vector beams, this disclosures describes constructing an experimental set up as illustrated in FIG. 2, which includes both a vector beam generation module (150) and a direct measurement characterization module (175). The method for generating the vector beam is adapted from reference [41] which is incorporated by reference here. In one non-limiting example, a beam (200) from a 532-nm laser (199) (Coherent Compass M315) with horizontal polarization is expanded and launched onto a spatial light modulator (SLM-1; Cambridge Correlaters SDE1024) (205). A computer-generated hologram (CGH)(275) is imprinted on SLM-1, and the diffracted light passes through a 4-f imaging system with spatial filtering at the focal plane. Such a setup can generate a field with any desired spatial profile with a high degree of control [42, 43] at the output (255) of the 4-f system. Here the system sets the desired spatial field to be two transversely separated coherent beams (250A, 250B), corresponding to the left circular polarization (LCP) and right circular polarization (RCP) components of the desired vector beam (255). A Sagnac interferometer (260) is placed between the second lens (253) and the image plane of the generation 4-f system, which is composed of a polarizing beam splitter (PBS) (261) and two mirrors (262A, 262B).

Before the twin-beam (250) enters the Sagnac interferometer (260), its polarization is adjusted to 45° using a polarizer in the form of a half wave plate (HWP) (286). As the twin beam (250) enters the Sagnac interferometer (260), it is split by the PBS (261) into horizontally- and vertically-polarized components (254A, 254B), which then pass through the interferometer (260) in opposite directions. The Sagnac interferometer (260) is adjusted such that the two polarization components (254A, 254B) experience a transverse shift at the output. Specifically, the left side of the H-polarized output overlaps with the right side of the V-polarized output. A quarter wave plate (QWP) (241) is used to convert the horizontal H- and vertical V-polarized components into left circular polarized LCP and right circular polarized RCP components (277A, 277B), respectively. An iris (242) is then used to only allow the generated vector beam (255) to pass to the camera (299).

As a result, the vector beam (255) produced by the generation module (150) has its two circular polarization components (277A, 277B) determined by the left and right part of the computer generated hologram (CGH) (275) on SLM-1, respectively. The direct measurement module is also built based on a 4-f imaging system, whose object plane overlaps with the output image plane of the beam generation module (150). A second Sagnac interferometer (263) is inserted before the first lens (289) to transform the vector beam (255), up to this point in the transmission being circular polarized beams (277A, 277B), into another twin-beam (288A, 288B) with a transverse shift of 2du between the horizontal and vertical polarization components. When a QWP (257) is used before the Sagnac interferometer, the vector beam characterization is effectively performed in the circular-polarization basis. When this QWP is absent, the beam characterization is performed in the horizontal and vertical linear polarization basis.

A polarizer (289) is placed after the Sagnac interferometer (263) to set the twin-beam (288A, 288B) uniformly polarized in the diagonal direction. A phase-only SLM (SLM-2; Hamamatsu X10468) (295) is placed at the focal plane of the characterization 4-f system to perform the weak polarization perturbation. SLM-2 only responds to horizontally-polarized light, and is operating in the reflection mode. The bi-refringent response of SLM-2 effectively alters the polarization of the reflected light, adjusting the polarization of the two components into the same horizontal linear polarization state as necessary to create a reference field (296). The phase on SLM-2 is set to zero everywhere except for a small area (237) near the center of the focused beam made of components (288A, 288B), which is given a non-zero phase value. The size of the small area (for example, but not limited to 80 μm by 80 μm) is comparable to the diffraction-limited spot size, and therefore the generated anti-diagonally-polarized reference field (296) at the detection plane can be expressed analytically via computerized hardware in the camera (299). A polarization-resolving camera (4D Technology PolarCam) is placed at the detection plane with a QWP (297) in front of it. The QWP (297) converts the diagonally and anti-diagonally polarized signal (288A, 288B) and reference beams (296A, 296B, 296C) into left- and right-handed circular polarizations, respectively.

The camera includes a micro-polarizer array that contains a pattern of linear polarizers (oriented at 0°, 45°, 90°, and 135°), capable of resolving the horizontal intensity Ih, the vertical intensity Iv, the diagonal intensity Id, and the anti-diagonal intensity Ia. Since all four polarizations can be measured simultaneously, the direct measurement of a vector beam can be performed in a single shot using the formula I sig=Ih−Iv. Note that the polarization-resolving camera can be replaced by a combination of beam splitters, polarization optics and a regular camera [40].

To demonstrate the capability of a direct measurement protocol, testing a variety of vector beams includes several that are commonly used in applications. First, the test generates a vector beam that has uniform amplitude over a circular aperture and Zernike polynomial phase profiles, Z2/4 and Z-2/2, encoded into the LCP and RCP components, respectively. The directly-measured real and imaginary parts of the two circular polarization components are shown in FIGS. 3(a)-(d). The corresponding phase profile of the two components as well as the profiles of three normalized Stokes parameters, are shown in FIGS. 3(e)-(i), respectively. One sees that experimental results match well with the theoretical expectations, shown as insets in the upper-right corner of each figure. To quantitatively evaluate direct measurement results, the beam fidelity is used as a figure of merit, which is defined as follows:

$$\mathcal{F} \equiv \frac{\left|\sum_p \int E_{p,exp}(x,y) E^*_{p,the}(x,y) dx dy\right|}{\sqrt{\sum_p \int |E_{p,exp}(x,y)|^2 dx dy} \sqrt{\sum_p \int |E_{p,the}(x,y)|^2 dx dy}}, \tag{18}$$

where the subscript p denotes the polarization components for the chosen basis, and Ep,exp and Ep,the denote the experimental results and theoretical predictions, respectively. The fidelity of the circular vector beam with uniform amplitude and Zernike polynomial phase profiles shown in FIG. 3 is calculated to be approximately 0.95, and similar high fidelity is observed for a variety of tested vector beams with different Zernike phase profiles. The high fidelity of the results demonstrates that the technique is capable of accurately measuring the complex field profiles as well as the polarization profile of vector beams. The resolution of the experimental result is approximately 100,000 pixels, which is limited by the numerical aperture of the imaging system and by the total pixel count of the camera used in the experiment.

Second, measuring a family of four vector vortex beams [1] that have been used for high-dimensional secure quantum communication [7, 8, 10] is completed. These four vector vortex beams use LG0,1 and LG0,−1 Laguerre-Gaussian (LG) modes as the two circular polarization components with an additional 0 or p phase difference between the two polarization components. Here LGp,1 denotes the Laguerre-Gaussian mode with radial index p and azimuthal index 1. As a result, these four vector beams have the same intensity profile but very different spatial polarization profiles as illustrated in the first row in FIG. 3. Since these four vector modes are orthogonal to each other, they can be used to represent 2 bits of information in a spatial-mode-encoding protocol. As shown in the second and third rows in FIG. 3, the direct measurement technique well reveals the azimuthal phase profile of each LG mode as well as the donut-shaped amplitude profile (illustrated by the saturation of each plots). Moreover, mode 1 and mode 2 (same for mode 3 and mode 4) have identical transverse phase profile for the LCP component, while the two RCP components have the same spiral phase structure, but have an additional "0" and "p"

phase difference with respect to the LCP component, respectively. This relative phase difference determines that mode 1 is radially polarized and mode 2 is azimuthally polarized. As shown in FIG. 4, the direct measurement method correctly measures the relative phase difference between the two polarization components for each mode, which can lead to the correct spatial profile of Stokes parameters. This would not have been possible if the complex field profiles of the two polarization components are measured separately. The fidelity of the measurement results for the four modes is 0.91, 0.92, 0.92 and 0.94, respectively. To further emphasize the advantage of the direct measurement method over conventional imaging polarimetry, we next demonstrate its ability to distinguish between two different vector beams with identical transverse polarization profiles. The first beam (mode 1 in FIG. 4) is comprised of LG0,1 and LG0,−1 Laguerre-Gaussian modes as the two circular polarization components. This disclosure first characterizes this vector vortex beam in the circular polarization bases. As shown in FIG. 5(a), measurements reveal correctly the amplitude and the phase of the LG0,1 and LG0,−1 modes in the circular polarization bases with the correct relative phase difference, which leads to the expected Stokes parameter profiles as well. It is well-known that such a radially-polarized beam can also be constructed by the superposition of HG1,0 and HG0,1 Hermite-Gaussian (HG) modes in the linear polarization basis [44]. When removing the QWP at the very front of the characterization module, one can measure the radially-polarized beam in the H-V polarization basis. As shown in FIG. 4(b), experimental results matches well with the theoretical prediction of the two HG modes, illustrating the versatility of the direct measurement method in characterizing vector beams in different polarization bases. The second vector beam is created using the same amplitude profile of the first beam, but the embodiments remove the spiral phase from the LCP component, and double the spiral phase on the RCP component. Since the relative phase difference between the LCP and RCP components at each point remains the same, the two vector beams have identical polarization profiles and therefore are indistinguishable if measured by conventional imaging polarimetry. While the measured Stokes parameter profiles show such indistinguishability in the polarization profile, the direct measurement method also reveals the different phase profiles of two vector beams [see FIGS. 4(a) and (c)]. Such a capability of resolving the complex field profile of individual polarization components makes the direct measurement technique a more valuable tool as compared to conventional imaging polarimetry.

Finally, we demonstrate the generation and characterization of a full Poincare beam, which has attracted a lot of research interest for its richness in fundamental physics as well as its potential applications in imaging and particle tracking [45]. A full-Poincaré beam is generated by superposing an LCP fundamental Gaussian mode and an RCP LG0,1 Laguerre-Gaussian mode. As shown in FIG. 6, experimental results match well with the theoretical predictions (shown as insets in the upper right corner of each plot), which indicates that the polarization state across the beam indeed spans the entire surface of the polarization Poincare sphere. The fidelity of the measurement result is 0.95, which further demonstrates that the direct measurement method is capable of measuring any possible fully polarized vector beam.

Examples

A computerized method of transmitting information via an optical vector beam (255) includes encoding the data onto a primary optical beam (200) to form the optical vector beam (255), wherein the encoding comprises differential spatial phase shift keying (DSPSK) in which the data is represented by physical changes in the optical vector beam (250) across spatially separated portions of the optical vector beam (250). At the receiving end, the data is decoded by identifying respective polarization states (310, 320, 330) and respective phase measurements for the spatially separated portions of the optical vector beam by:

(i) selecting, from the spatially separated portions of the optical vector beam, at least two orthogonally polarized portions of the optical vector beam; and (ii) identifying the data in the optical vector beam by tracking differences between the respective phase measurements (370, 380) for the at least two orthogonally polarized portions (410, 420, 430, 440) of the optical vector beam (255). In one non-limiting embodiment, encoding the data onto the primary optical beam includes directing the primary optical beam (200) to a first spatial light modulator (SLM-1) (205) and using an imprinted hologram (275) on the SLM-1 (205) to receive the primary optical beam (200) and convert the primary optical beam (200) into the optical vector beam having spatially separated and orthogonally polarized twin beam portions (250A, 250B). The radius of the twin beams is used as a minimum value for radially separating the twin beam portions such that polarized components of the twin beam portions are non-overlapping. The method includes adjusting the polarized components of the twin beam portions into a common horizontal linear polarization state to adjust the optical vector beam into a spatially-coherent scalar beam of a single polarization.

In one embodiment, the primary optical beam comprises phase changes across an electrical field, wherein the phase changes represent the data being transmitted. The SLM-1 (205) encodes phase changes into the electrical field of the optical vector beam, wherein the phase changes represent the data being transmitted.

At the receiving end for decoding the data, the computerized method described herein includes characterizing the optical vector beam according to a transverse profile of the at least two orthogonally polarized portions of the optical vector beam and measuring relative phase information between the at least two orthogonally polarized portions, wherein the relative phase information is measured for each of the polarized portions simultaneously. Characterizing the optical vector beam according to a transverse profile includes submitting the optical vector beam to a generation module (150) having optical components configured for directing the optical vector beam from the SLM-1 (205) to a 4-F imaging system (260) with spatial filtering at a focal plane. The 4-f imaging system forms, from the optical vector beam (205), a spatial field for the optical vector beam, wherein the spatial field comprises two transversely separated light beams (254A, 254B) corresponding to respective left circularly polarized (LCP) and right circularly polarized (RCP) components of the optical vector beam. The two beams are separated by the relative transverse shift value, 2du discussed above, between the two polarization components of the vector beam. In one non-limiting embodiment, the value of du is chosen to be slightly larger than the radius of the beam such that the two polarization components are non-overlapping, and the generated vector beam (255) includes the two circular polarization components that correspond to the imprinted hologram on the SLM-1.

In one non-limiting embodiment, the generated vector beam is directed to a second spatial light modulator SLM-2 (295), wherein the second SLM-2 applies a polarization perturbation to the generated vector beam to generate a reference electric field beam (296) within the generated vector beam. By imaging the generated vector beam with a polarization resolving camera (299) the method converts electric fields of the generated vector beam and the reference field formed by the SLM-2 into decodable left circular polarizations and decodable right circular polarizations. The optical vector beam is further subject to simultaneously measuring a respective horizontal intensity (Ih), vertical intensity (Iv), diagonal intensity (Id), and anti-diagonal intensity (Ia) of the generated vector beam. Characterizing the optical vector beam then includes calculating the Stokes parameters of the generated vector beam from the left and right parts of the generated vector beam to decipher a transverse field profile of the twin beam representing the optical vector beam.

In conclusion, this disclosure introduces a direct measurement protocol that is capable of characterizing the full transverse field profile of fully-polarized vector beams. The direct measurement process involves a separation of orthogonal polarization components, a weak polarization perturbation, and a polarization resolving imaging process. The measured polarization of the final detected field is directly related to the real and imaginary part of the complex-amplitude profile of each polarization component of the vector beam. The information herein demonstrated a direct measurement protocol by measuring a variety of vector beams that are relevant to optical information science, including vector vortex beams and full Poincaré beams. Experimental measurement results have shown consistently high data fidelity, and its unique capability of revealing both the complex-amplitude and polarization information provides a robust and versatile metrology tool for fundamental studies of vector beams and a wide spectrum of applications utilizing vector beams. The disclosed protocol is equally suited for use in classical and quantum regimes, and the experimental setup can be easily modified to measure single photons that have pure vectorial transverse modes.

REFERENCES

1. Q. Zhan, "Cylindrical vector beams: from mathematical concepts to applications," Adv. Opt. Photon. 1, 1-57 (2009).
2. A. F. Abouraddy and K. C. Toussaint, "Three-dimensional polarization control in microscopy," Phys. Rev. Lett. 96, 153901 (2006).
3. Q. Zhan and J. R. Leger, "Focus shaping using cylindrical vector beams," Opt. Express 10, 324-331 (2002).
4. M. G. Donato, S. Vasi, R. Sayed, P. H. Jones, F. Bonaccorso, A. C. Ferrari, P. G. Gucciardi, and 0. M. Maragò, "Optical trapping of nanotubes with cylindrical vector beams," Opt. Lett. 37, 3381-3383 (2012).
5. H. Rubinsztein-Dunlop, A. Forbes, M. V. Berry, M. R. Dennis, D. L. Andrews, M. Mansuripur, C. Denz, C. Alpmann, P. Banzer, T. Bauer, E. Karimi, L. Marrucci, M. Padgett, M. Ritsch-Marte, N. M. Litchinitser, N. P. Bigelow, C. Rosales-Guzman, A. Belmonte, J. P. Torres, T. W., Neely, M. Baker, R. Gordon, A. B. Stilgoe, J. Romero, A. G. White, R. Fickler, A. E. Willner, G. Xie, B. McMorran, and A. M. Weiner, "Roadmap on structured light," J. Opt. 19, 013001 (2017).
6. M. Beresna, M. Gecevičius, and P. G. Kazansky, "Polarization sensitive elements fabricated by femtosecond laser nanostructuring of glass," Opt. Mater. Express 1, 783-795 (2011).

7. G. Milione, T. A. Nguyen, J. Leach, D. A. Nolan, and R. R. Alfano, "Using the nonseparability of vector beams to encode information for optical communication," Opt. Lett. 40, 4887-4890 (2015).
8. G. Milione, M. P. J. Lavery, H. Huang, Y. Ren, G. Xie, T. A. Nguyen, E. Karimi, L. Marrucci, D. A. Nolan, R. R. Alfano, and A. E. Willner, "4×20 gbit/s mode division multiplexing over free space using vector modes and a q-plate mode (de)multiplexer," Opt. Lett. 40, 1980-1983 (2015).
9. Y. Zhao and J. Wang, "High-base vector beam encoding/decoding for visible-light communications," Opt. Lett. 40, 4843-4846 (2015).
10. A. Sit, F. Bouchard, R. Fickler, J. Gagnon-Bischoff, H. Larocque, K. Heshami, D. Elser, C. Peuntinger, K. Günthner, B. Heim, C. Marquardt, G. Leuchs, R. W. Boyd, and E. Karimi, "High-dimensional intracity quantum cryptography with structured photons," Optica 4, 1006-1010 (2017).
11. C. Maurer, A. Jesacher, S. Fürhapter, S. Bernet, and M. Ritsch-Marte, "Tailoring of arbitrary optical vector beams," New J Phys 9, 78 (2007).
12. X.-L. Wang, J. Ding, W.-J. Ni, C.-S. Guo, and H.-T. Wang, "Generation of arbitrary vector beams with a spatial light modulator and a common path interferometric arrangement," Opt. Lett. 32, 3549-3551 (2007).
13. L. Marrucci, C. Manzo, and D. Paparo, "Optical spin-to-orbital angular momentum conversion in inhomogeneous anisotropic media," Phys. Rev. Lett. 96, 163905 (2006).
14. S. Slussarenko, A. Murauski, T. Du, V. Chigrinov, L. Marrucci, and E. Santamato, "Tunable liquid crystal q-plates with arbitrary topological charge," Opt. Express 19, 4085-4090 (2011).
15. F. Cardano, E. Karimi, S. Slussarenko, L. Marrucci, C. de Lisio, and E. Santamato, "Polarization pattern of vector vortex beams generated by q-plates with different topological charges," Appl. Opt. 51, C1-C6 (2012).
16. G. Volpe and D. Petrov, "Generation of cylindrical vector beams with few-mode fibers excited by laguerre-gaussian beams," Opt. Commun. 237, 89-95 (2004).
17. S. Ramachandran, P. Kristensen, and M. F. Yan, "Generation and propagation of radially polarized beams in optical fibers," Opt. Lett. 34, 2525-2527 (2009).
18. Z. Zhao, J. Wang, S. Li, and A. E. Willner, "Metamaterials-based broadband generation of orbital angular momentum carrying vector beams," Opt. Lett. 38, 932-934 (2013).
19. A. Arbabi, Y. Horie, M. Bagheri, and A. Faraon, "Dielectric metasurfaces for complete control of phase and polarization with subwavelength spatial resolution and high transmission," Nat. Nanotechnol 10, 937-943 (2015).
20. J. S. Tyo, D. L. Goldstein, D. B. Chenault, and J. A. Shaw, "Review of passive imaging polarimetry for remote sensing applications," Appl. Opt. 45, 5453-5469 (2006).
21. B. Ndagano, I. Nape, B. Perez-Garcia, S. Scholes, R. I. Hernandez-Aranda, T. Konrad, M. P. Lavery, and A. Forbes, "A deterministic detector for vector vortex states," Sci. Rep. 7, 13882 (2017).
22. M. McLaren, T. Konrad, and A. Forbes, "Measuring the nonseparability of vector vortex beams," Phys. Rev. A 92, 023833 (2015).
23. D. Malacara, Optical Shop Testing (Wiley, New York, 1978).
24. J. Hartmann, "Bemerkungen" uber den bau and die justirung von spektrographen," Zt. Instrumentenkd. 29, 47 (1900).
25. R. V. Shack and B. C. Platt, "Production and use of a lenticular Hartmann screen (abstract)," J. Opt. Soc. Am. 61, 656 (1971).
26. R. N. Smartt and J. Strong, "Point-diffraction interferometer (abstract)," J. Opt. Soc. Am. 62, 737 (1972).
27. K. L. Marshall, K. Adelsberger, G. Myhre, and D. W. Griffin, "The lcpdi-A compact and robust phase-shifting point-diffraction interferometer based on dye-doped lc technology," Molecular Crystals and Liquid Crystals 454, 2344251-4544471 (2006).
28. R. M. Neal and J. C. Wyant, "Polarization phase-shifting point diffraction interferometer," Appl. Opt. 45, 3463-3476 (2006).
29. J. R. Fienup, "Phase retrieval algorithms: a comparison," Appl. Opt. 21, 2758-2769 (1982).
30. G. Sirat and D. Psaltis, "Conoscopic holography," Opt. Lett. 10, 4-6 (1985).
31. K. Buse and M. Luennemann, "3d imaging: Wave front sensing utilizing a birefringent crystal," Phys. Rev. Lett. 85, 3385-3387 (2000).
32. R. Ragazzoni, E. Marchetti, and F. Rigaut, "Modal tomography for adaptive optics," Astron. Astrophys. 342, L53-L56 (1999).
33. E. Wolf, "Solution of the phase problem in the theory of structure determination of crystals from x-ray diffraction experiments," Phys. Rev. Lett. 103, 075501 (2009).
34. J. S. Lundeen, B. Sutherland, A. Patel, C. Stewart, and C. Bamber, "Direct measurement of the quantum wavefunction," Nature 474, 188 (2011).
35. J. S. Lundeen and C. Bamber, "Procedure for direct measurement of general quantum states using weak measurement," Phys. Rev. Lett. 108, 070402 (2012).
36. S. Wu, "State tomography via weak measurements," Sci. Rep. 3, 1193 (2013).
37. M. Mirhosseini, O. S. Magaña Loaiza, S. M. Hashemi Rafsanjani, and R. W. Boyd, "Compressive direct measurement of the quantum wave function," Phys. Rev. Lett. 113, 090402 (2014).
38. J. Z. Salvail, M. Agnew, A. S. Johnson, E. Bolduc, J. Leach, and R. W. Boyd, "Full characterization of polarization states of light via direct measurement," Nat. Photonics 7, 316-321 (2013).
39. M. Malik, M. Mirhosseini, M. P. Lavery, J. Leach, M. J. Padgett, and R. W. Boyd, "Direct measurement of a 27-dimensional orbital-angular momentum state vector," Nat. Commun. 5, 3115 (2014).
40. Z. Shi, M. Mirhosseini, J. Margiewicz, M. Malik, F. Rivera, Z. Zhu, and R. W. Boyd, "Scan-free direct measurement of an extremely high dimensional photonic state," Optica 2, 388-392 (2015).
41. B. Perez-Garcia, C. Lopez-Mariscal, R. I. Hernandez-Aranda, and J. C. Gutierrez-Vega, "On-demand tailored vector beams," Appl. Opt. 56, 6967-6972 (2017).
42. J. A. Davis, D. M. Cottrell, J. Campos, M. J. Yzuel, and I. Moreno, "Encoding amplitude information onto phase-only filters," Appl. Opt. 38, 5004-5013 (1999).
43. V. Arrizón, U. Ruiz, R. Carrada, and L. A. Gonzalez, "Pixelated phase computer holograms for the accurate encoding of scalar complex fields," J. Opt. Soc. Amer. A 24, 3500-3507 (2007).
44. Q. Zhan, "Cylindrical vector beams: from mathematical concepts to applications," Adv. Opt. Photon. 1, 1-57 (2009).
45. A. M. Beckley, T. G. Brown, and M. A. Alonso, "Full poincaré beams," Opt. Express 18, 10777-10785 (2010).

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the invention.

What is claimed is:

1. A computerized method of transmitting information via an optical vector beam, the method comprising:
    encoding the data onto a primary optical beam to form the optical vector beam, wherein the encoding comprises differential spatial phase shift keying (DSPSK) in which the data is represented by physical changes in the optical vector beam across spatially separated portions of the optical vector beam;
    decoding the data by identifying respective polarization states and respective phase measurements for the spatially separated portions of the optical vector beam by:
    (i) selecting, from the spatially separated portions of the optical vector beam, at least two orthogonally polarized portions of the optical vector beam; and
    (ii) identifying the data in the optical vector beam by tracking differences between the respective phase measurements for the at least two orthogonally polarized portions of the optical vector beam;
    wherein encoding the data onto the primary optical beam comprises:
    directing the primary optical beam to a first spatial light modulator (SLM-1);
    using an imprinted hologram on the SLM-1 to receive the primary optical beam and convert the primary optical beam into the optical vector beam comprising spatially separated and orthogonally polarized twin beam portions;
    radially separating the twin beam portions such that polarized components of the twin beam portions are non-overlapping;
    adjusting the polarized components of the twin beam portions into a common horizontal linear polarization state to adjust the optical vector beam into a spatially-coherent scalar beam of a single polarization.

2. The computerized method of claim 1, wherein the primary optical beam comprises phase changes across an electrical field, wherein the phase changes represent the data being transmitted.

3. The computerized method of claim 1, wherein the SLM-1 encodes phase changes into the electrical field of the optical vector beam, wherein the phase changes represent the data being transmitted.

4. The computerized method of claim 1, wherein decoding the data comprises characterizing the optical vector beam according to a transverse profile of the at least two orthogonally polarized portions of the optical vector beam and measuring relative phase information between the at least two orthogonally polarized portions, wherein the relative phase information is measured for each of the polarized portions simultaneously.

5. The computerized method of claim 4, wherein characterizing the optical vector beam according to a transverse profile comprises submitting the optical vector beam to a generation module comprising optical components configured for:
    directing the optical vector beam from the SLM-1 to a 4-F imaging system with spatial filtering at a focal plane;
    using the 4-F imaging system to form, from the optical vector beam, a spatial field for the optical vector beam, wherein the spatial field comprises two transversely separated light beams corresponding to respective left circularly polarized (LCP) and right circularly polarized (RCP) components of the optical vector beam;
    defining a generated vector beam comprising the two circular polarization components that correspond to the imprinted hologram on the SLM-1.

6. The computerized method of claim 5, further comprising directing the generated vector beam to a second spatial light modulator SLM-2, wherein the second SLM-2 applies a polarization perturbation to the generated vector beam to generate a reference electric field beam within the generated vector beam.

7. The computerized method of claim 6, further comprising imaging the generated vector beam with a polarization resolving camera that converts electric fields of the generated vector beam and the reference field formed by the SLM-2 into decodable left circular polarizations and decodable right circular polarizations.

8. The computerized method of claim 7, wherein characterizing the optical vector beam further comprises simultaneously measuring a respective horizontal intensity (Ih), vertical intensity (Iv), diagonal intensity (Id), and anti-diagonal intensity (Ia) of the generated vector beam.

9. The computerized method of claim 8, wherein characterizing the optical vector beam further comprises calculating the Stokes parameters of the generated vector beam from the left and right parts of the generated vector beam to decipher a transverse field profile of the twin beam representing the optical vector beam.

10. A computerized method of transmitting information via an optical vector beam, the method comprising:
    encoding the data onto a primary optical beam to form the optical vector beam, wherein the encoding comprises differential spatial phase shift keying (DSPSK) in which the data is represented by physical changes in the optical vector beam across spatially separated portions of the optical vector beam;
    decoding the data by identifying respective polarization states and respective phase measurements for the spatially separated portions of the optical vector beam by:
    (i) selecting, from the spatially separated portions of the optical vector beam, at least two orthogonally polarized portions of the optical vector beam; and
    (ii) identifying the data in the optical vector beam by tracking differences between the respective phase measurements for the at least two orthogonally polarized portions of the optical vector beam;
    wherein decoding the data comprises characterizing the optical vector beam according to a transverse profile of the at least two orthogonally polarized portions of the optical vector beam and measuring relative phase information between the at least two orthogonally polarized portions, wherein the relative phase information is measured for each of the polarized portions simultaneously.

11. The computerized method of claim 10, wherein the primary optical beam comprises phase changes across an electrical field, wherein the phase changes represent the data being transmitted.

12. The computerized method of claim 10, wherein encoding the data onto the primary optical beam comprises:
    directing the primary optical beam to a first spatial light modulator (SLM-1);
    using an imprinted hologram on the SLM-1 to receive the primary optical beam and convert the primary optical beam into the optical vector beam comprising spatially separated and orthogonally polarized twin beam portions;

radially separating the twin beam portions such that polarized components of the twin beam portions are non-overlapping;

adjusting the polarized components of the twin beam portions into a common horizontal linear polarization state to adjust the optical vector beam into a spatially-coherent scalar beam of a single polarization.

13. The computerized method of claim 12, wherein the SLM-1 encodes phase changes into the electrical field of the optical vector beam, wherein the phase changes represent the data being transmitted.

14. The computerized method of claim 10, wherein characterizing the optical vector beam according to a transverse profile comprises submitting the optical vector beam to a generation module comprising optical components configured for:

directing the optical vector beam from the SLM-1 to a 4-F imaging system with spatial filtering at a focal plane;

using the 4-F imaging system to form, from the optical vector beam, a spatial field for the optical vector beam, wherein the spatial field comprises two transversely separated light beams corresponding to respective left circularly polarized (LCP) and right circularly polarized (RCP) components of the optical vector beam;

defining a generated vector beam comprising the two circular polarization components that correspond to the imprinted hologram on the SLM-1.

15. The computerized method of claim 14, further comprising directing the generated vector beam to a second spatial light modulator SLM-2, wherein the second SLM-2 applies a polarization perturbation to the generated vector beam to generate a reference electric field beam within the generated vector beam.

16. The computerized method of claim 15, further comprising imaging the generated vector beam with a polarization resolving camera that converts electric fields of the generated vector beam and the reference field formed by the SLM-2 into decodable left circular polarizations and decodable right circular polarizations.

17. The computerized method of claim 16, wherein characterizing the optical vector beam further comprises simultaneously measuring a respective horizontal intensity (Ih), vertical intensity (Iv), diagonal intensity (Id), and anti-diagonal intensity (Ia) of the generated vector beam.

18. The computerized method of claim 17, wherein characterizing the optical vector beam further comprises calculating the Stokes parameters of the generated vector beam from the left and right parts of the generated vector beam to decipher a transverse field profile of the twin beam representing the optical vector beam.

* * * * *